United States Patent
Lindoff et al.

(10) Patent No.: US 7,885,662 B2
(45) Date of Patent: Feb. 8, 2011

(54) SELECTION OF CHANNEL FOR RADIO RESOURCE CONTROL SIGNALING IN HSDPA

(75) Inventors: Bengt Lindoff, Bjärred (SE); Johan Nilsson, Höllviken (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 766 days.

(21) Appl. No.: 11/286,500

(22) Filed: Nov. 23, 2005

(65) Prior Publication Data

US 2007/0049308 A1 Mar. 1, 2007

Related U.S. Application Data

(60) Provisional application No. 60/712,382, filed on Aug. 30, 2005.

(51) Int. Cl.
*H04W 72/00* (2009.01)
*H04B 7/00* (2006.01)

(52) U.S. Cl. ................ 455/450; 455/509; 455/456; 455/464; 455/451; 455/452

(58) Field of Classification Search ............... 455/450, 455/509, 456, 464, 451, 452
See application file for complete search history.

(56) References Cited

U.S. PATENT DOCUMENTS

| | | | |
|---|---|---|---|
| 5,901,354 A | 5/1999 | Menich et al. | |
| 6,055,427 A | 4/2000 | Ojaniemi | |
| 7,283,782 B2 * | 10/2007 | Sinnarajah et al. | 455/450 |
| 2003/0185202 A1 * | 10/2003 | Maenpaa | 370/352 |
| 2004/0082336 A1 * | 4/2004 | Jami et al. | 455/450 |
| 2005/0075110 A1 * | 4/2005 | Posti et al. | 455/452.1 |
| 2005/0078648 A1 | 4/2005 | Nilsson | |
| 2005/0239435 A1 * | 10/2005 | Ikeda et al. | 455/436 |
| 2006/0140113 A1 * | 6/2006 | Anderlind et al. | 370/229 |
| 2007/0275728 A1 * | 11/2007 | Lohr et al. | 455/450 |
| 2008/0089229 A1 * | 4/2008 | Andersson | 370/230 |

FOREIGN PATENT DOCUMENTS

| | | |
|---|---|---|
| EP | 1 223 769 | 7/2002 |
| EP | 1 569 492 A2 | 8/2005 |
| EP | 1 575 321 A1 | 9/2005 |

OTHER PUBLICATIONS

EP 04029822.6, Lindoff.

* cited by examiner

*Primary Examiner*—Wen W Huang
(74) *Attorney, Agent, or Firm*—Coats & Bennett, P.L.L.C.

(57) ABSTRACT

A Radio Network Controller (RNC) is configured to send Radio Resource Control (RRC) messages to a mobile station using a selected downlink channel. Depending on the mobility rate of the mobile station, the RNC is configured to configure a signaling connection to use either a first downlink channel or a second downlink channel for transmitting the RRC messages. According to one embodiment, the RNC selects a dedicated channel when the mobile station has a high mobility rate, and selects a shared channel when the mobile station has a low mobility rate.

19 Claims, 4 Drawing Sheets

SELECTION OF CHANNEL FOR RADIO RESOURCE CONTROL SIGNALING IN HSDPA

RELATED APPLICATIONS

This application claims priority from U.S. Provisional Patent Application Ser. No. 60/712,382 filed 30 Aug. 2005, which is incorporated herein by reference.

BACKGROUND

The present invention relates generally to Code Division Multiple Access (CDMA) systems, and more particularly, to radio resource control signaling for HSDPA in WCDMA systems.

High Speed Downlink Packet Access (HSDPA) is a packet data service offered in Wideband Code Division Multiple Access (WCDMA) networks. The HSDPA is an evolution of WCDMA specified by the Third Generation Partnership Project (3GPP) in Release 99 of the WCDMA standard. The HSDPA, introduced in Release 5 of the WCDMA standard, provides peak data rates up to 10 Mbits/s using enhanced features such as higher-order modulation (16 QAM), physical layer retransmission with soft combining, hybrid automatic repeat request (H-ARQ), multicode transmission, fast link adaptation, and fast scheduling. The transport channel for HSDPA is the High Speed Downlink Shared Channel (HS-DSCH). The HS-DSCH is carried over the High Speed Physical Downlink Shared Channel (HS-PDSCH).

The HS-DSCH is a time multiplexed channel shared by a plurality of mobile stations. Mobile stations are scheduled to receive data on the HS-PDSCH by a serving base station. The scheduling interval is referred to as a Transmission Time Interval (TTI). During a given TTI, one or more mobile stations may be scheduled. The mobile stations report channel conditions to the base station on an uplink channel called the High Speed Dedicated Physical Control Channel (HS-DPCCH) to enable the base station to make scheduling decisions. The base station schedules the mobile station based, at least in part, on the reported channel conditions. The identity of the mobile stations scheduled to receive packet data on the HS-DSCH in a given TTI is transmitted on the High Speed Shared Control Channel (HS-SCCH). The HS-SCCH is also used to send transmission parameters needed by the mobile station to decode the HS-DSCH, such as the code channels, the transport block size, and the modulation scheme used in the corresponding TTI.

In release 5 of the WCDMA standard, the HS-DSCH always operates in conjunction with an Associated Dedicated Physical Channel (A-DPCH). The A-DPCH carries power control signals and Radio Resource Control (RRC) messages between the mobile station and the base station. Radio resource control is a protocol that provides control of the mobile station by a radio network controller in a radio access network. Release 6 of the WCDMA standard allows RRC signaling messages to be transmitted to the mobile station over the HS-PDSCH instead of the A-DPCH. The reason for using in band signaling on the HS-PDSCH is to reduce the amount of power allocated for signaling purposes so that more power can be allocated to the HS-DSCH. In release 6 of the WCDMA standard, RRC messages may be sent in band on the HS-PDSCH. When in band signaling over the HS-PDSCH is used, the DPCH is used to carry only power control information and is called a fractional-DPCH (F-DPCH).

Unlike the A-DPCH, the HS-PDSCH does not use soft handover and transmission of RRC signaling to the mobile station is likely to be less reliable than using the A-DPCH. Channel conditions may fluctuate rapidly on the HS-PDSCH, particularly when the mobile station is moving at a high rate of speed. If critical RRC messages, such as handover messages, are lost due to poor channel conditions, radio link failure may be the result. Therefore, there is a need to make signaling between the base station and the mobile station more robust, particularly when in-band signaling on the HS-PDSCH is used to carry RRC messages.

SUMMARY

Embodiments of the present invention provide a method and apparatus for sending Radio Resource Control (RRC) messages from a radio network controller (RNC) to a mobile station. The RNC establishes an RRC connection with the mobile station for sending signaling messages to the mobile station. Depending on the mobility rate of the mobile station, the RNC may select either a first downlink channel or a second downlink channel for transmitting the RRC messages to the mobile station. The first downlink channel is selected when the mobile station is traveling at a high speed. The second downlink channel is selected when the mobile station is traveling at a low speed. In one example embodiment, the first downlink channel may comprise a dedicated channel and the second downlink channel may comprise a shared channel.

The RRC connection can be dynamically reconfigured by the RNC responsive to changes in the mobility rate or speed of the mobile station. The RNC monitors the mobility rate of the mobile station during an HSDPA session and reconfigures the RRC connection depending on the mobility rate. The mobility rate can be determined based on signal characteristics of the received signal from the mobile station. Examples of signal characteristics include the Doppler spread of the received signal or the signal strength of the received signal. Also, the mobility rate can be estimated based on other factors such as the handover frequency.

One example embodiment of the invention comprises a signaling method implemented by a radio network controller. The signaling method comprises determining the mobility rate of the mobile station, selecting one of a first or second downlink channel to use to establish a signaling connection with the mobile station, and configuring the signaling connection with the mobile station to use the selected downlink channel.

Another example embodiment of the invention comprises a radio network controller for a mobile communication network. The radio network controller comprises a control unit and a signaling processor. The control unit is configured to determine the mobility rate of the mobile station, to select one of a first or second downlink channel depending on the mobility rate, and to configure a signaling connection with the mobile station to use the selected downlink channel. A signaling processor is configured to use the established signaling connection to exchange signaling messages with the mobile station.

DETAILED DESCRIPTION

Figure 1:
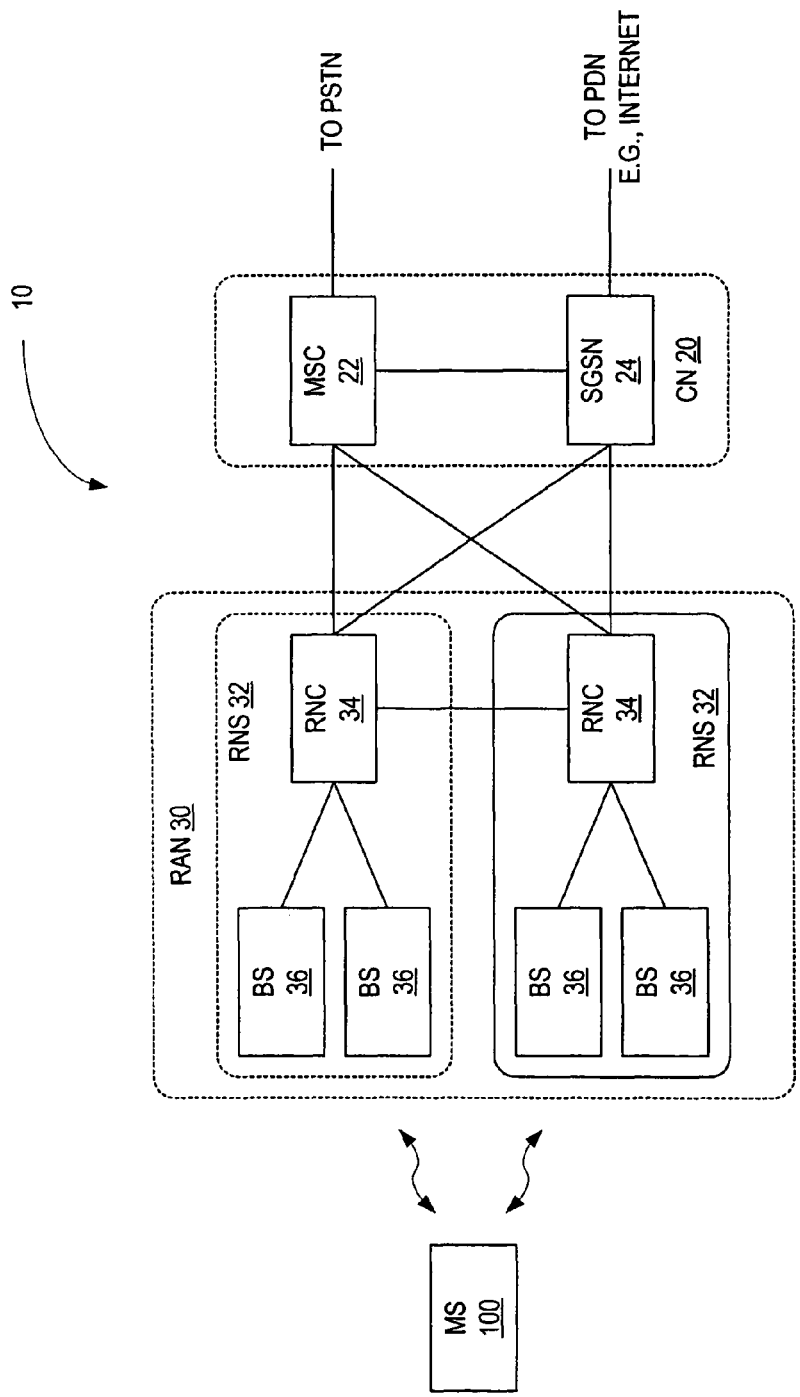
FIG. 1 illustrates an example mobile communication network.

FIG. 1 illustrates an example wireless communication network 10 for providing mobile communication services to one or more mobile stations 100. The term mobile station as used herein refers to any portable communication device having the ability to connect wirelessly to a communication network. The term mobile station includes, without limitation, mobile telephones, pagers, personal digital assistants, and laptop or handheld computers. The example wireless communication network 10 comprises a Wideband Code Division Multiple Access (WCDMA) system as specified by the Third Generation Partnership Project (3GPP). Those skilled in the art will recognize that the present invention may also be used in mobile communication networks based on other standards, such as cdma2000 (TIA-2000), 1xEV-DO (TIA-856a), and WiMAX (IEEE 802.16).

Wireless communication network 10 comprises a core network (CN) 20 connecting to one or more external packet data networks, such as the Internet, and one or more radio access networks (RANs) 30. The core network 20 is responsible for switching and routing of calls between the mobile stations 100 and external networks. The core network 20 may include a Mobile switching Center (MSC) 22 for providing circuit-switched services and a Serving GPRS Support Node (SGSN) 24 for providing packet switched services. The main function of the RAN 30 is to provide mobile stations 100 with access to the core network 20. RAN 30 includes one or more radio network sub-systems (RNSs) 32. An RNS 32 comprises a radio network controller (RNC) 34 and one or more base stations (BSs) 36, referred to in the WCDMA standards as Node Bs. This application uses the generic term base station (BS) instead of the WCDMA-specific term Node B.

BSs 36 communicate with the mobile stations 100 over the air interface and are normally associated with a cell. A BS 36 may provide service in more than one cell. The RNC 34 is the network component that connects the RAN 30 to the core network 20 and controls RAN functions. The RNC 34 manages the BSs 36 and radio resources within its domain and terminates Radio Resource Control (RRC). RRC is a protocol that provides control over the mobile station by the RNC 34. The RRC functions performed by the RNC 34 include measurement reporting, active set management and handover control.

High Speed Downlink Packet Access (HSDPA) is one method implemented by the wireless communication network 10 to deliver packets on the downlink to the mobile station 100. HSDPA is an evolution of the Downlink Shared Channel (DSCH) in prior versions of the WCDMA standard. HSDPA was introduced in Release 5 of the WCDMA standard. The main purpose of HSDPA is to increase data throughput using enhancements such as fast scheduling, fast link adaptation, physical layer automatic repeat request (HARQ), smaller packet size, and multi-code transmission. HSDPA takes advantage of the bursty nature of packet data to share the available radio resources among a plurality of users and thereby make more efficient use of those resources.

HSDPA provides a new transport channel for high speed packet delivery on the downlink called the High Speed Downlink Shared Channel (HS-DSCH) and two new downlink physical channels: the High Speed Physical Downlink Shared Channel (HS-PDSCH) to carry user data, and the High Speed Shared Control Channel (HS-SCCH) to carry downlink signaling for identifying the mobile station being scheduled and for indicating the transmission parameters needed by the mobile station to decode the HS-PDSCH. HSDPA also adds one uplink channel called the High Speed Dedicated Physical Control Channel (HS-DPCCH) to carry uplink signaling, such as (acknowledgement non-acknowledgement) ACK/NACK signaling for H-ARQ operation and Channel Quality Indications (CQI) for scheduling and rate control. HSDPA according to Release 5 of the WCDMA standard always operates in conjunction with a corresponding Associated Dedicated Physical Channel (A-DPCH). The A-DPCH is used to send power control commands and may also be used to send RRC signaling to the mobile station 100. Release 6 of the WCDMA standard allows a serving base station to send RRC signaling messages to the mobile station in band over the High Speed Physical Downlink Shared Channel (HS-PDSCH) instead of the A-DPCH, and in that case, the DPCH is used only for carrying power control information and is called a fractional DPCH (F-DPCH).

Transmissions on the HS-DSCH are divided into 2 ms units of time called a Transmission Time Interval (TTI). A TTI is further divided into 3 timeslots of 0.667 ms each. A TTI is the basic unit of time used to schedule mobile stations 100 on the HS-DSCH. Scheduling is a function performed by a scheduler located in the serving BS 36. The scheduler at the serving BS 36 determines which mobile stations 100 shall receive data in each TTI based on factors such as the channel conditions reported by each mobile station 100, the amount of data pending in the buffer for each mobile station 100, the average throughput to each mobile station 100, and any Quality of Service (QoS) guarantees. The scheduling algorithm is typically determined by the network operator. During any given TTI, BS 36 allocates up to 15 channelization codes to one or more mobile stations 100.

The BS 36 identifies the mobile station(s) 100 being scheduled, the code allocations, and the transmission format via the HS-SCCH. The HS-SCCH is a fixed rate channel (60 kbps, spreading factor=128) used to transmit downlink signaling before the start of a corresponding TTI. The HS-SCCH is divided into two parts. Part 1 carries critical information needed by the mobile station 100 to begin demodulation of the HS-DSCH. Part 2 carries less critical information, such as a Cyclic Redundancy Check (CRC) and HARQ process information. The BS 36 transmits the HS-SCCH two timeslots before the start of the corresponding TTI. Both parts are transmitted with a mobile station specific mask that identifies the mobile station 100 scheduled in the corresponding TTI.

The HS-DPCCH is an uplink channel that carries signaling associated with HSDPA operations. The mobile station 100 uses the HS-DPCCH to send a Channel Quality Indicator (CQI) to the BS 36. BS 36 uses the CQI to make scheduling decisions. The mobile station 100 also uses the HS-DPCCH to send an ACK/NACK indicator to BS 36 for HARQ operations to indicate whether transmitted packets were successfully received.

The mobile station 100 monitors the HS-SCCH to determine when it is scheduled to receive packet data on the HS-PDSCH. More particularly, mobile station 100 decodes Part 1 of each HS-SCCH to determine if it has been scheduled for the corresponding TTI. When the mobile station 100 is scheduled in the corresponding TTI, it also decodes Part 2 of the HS-SCCH and begins decoding the HS-PDSCH at the start of the designated TTI. After decoding the HS-PDSCH, the mobile station 100 sends an ACK/NACK indicator to the BS 36 on the HS-DPSCCH to indicate whether the packet data was successfully received.

Radio resource control (RRC) is performed by the RNC 34 when the mobile station 100 is operating on the HS-DSCH. RRC is a protocol for managing the radio resources. RRC functions include configuring radio bearers, transport channels and physical channels, measurement control over mobile station measurements, and handover control. To perform these functions, the RNC 34 sets up an RRC connection and signaling bearer between the RNC 34 and mobile station 100. Setting up, maintaining, and releasing the RRC connection is also one of the RRC functions. Conventionally, RRC messages are sent between the RNC 34 and mobile station 100 over a dedicated traffic channel, such as the A-DPCH. Release 6 of the WCDMA standard permits downlink RRC messages to be transmitted to the mobile station 100 in band on the HS-PDSCH, which is a shared traffic channel. The motivation for this change was to reduce the power allocated to the dedicated channels so that more power would be available for the HS-PDSCH. In that case, the DPCH is used only to carry power control information and is called a fractional-DPCH (F-DPCH).

One difference between the A-DPCH and the HS-PDSCH is the use of soft handoff on the A-DPCH. During soft handoff, the mobile station 100 receives signals from multiple base stations 36, which makes reception more reliable. In contrast, soft handoff is not used for the HS-PDSCH due to the complexity of coordinating transmission from different cells. The signal quality from the serving BS 36 is likely to fluctuate significantly, particularly when the mobile station 100 is moving at a high rate of speed, which may result in loss of packets. The loss of critical RRC messages can result in radio link failure.

Due to the use of soft handoff, the A-DPCH provides a more reliable mechanism for transmitting RRC messages to the mobile station 100. On the other hand, using the A-DPCH for RRC signaling reduces the amount power and code resources available for the HS-PDSCH. The present invention balances the need for reliable signaling with the desire to reduce power and code resources dedicated to signaling by using a technique referred to herein as channel type switching. The RNC 34 monitors the mobility rate of the mobile station 100 relative to a serving BS 36. The mobility rate of the mobile station 100 may be determined based on measurements of the received signal from the mobile station 100, or based on other criterion such as handover frequency. For example, the occurrence of 4 to 5 handovers per minute indicates a high mobility mobile station 100. The occurrence of less than 1 handover per minute indicates a low mobility mobile station 100. Based on the mobility rate of the mobile station 100, the RNC 34 selects either the A-DPCH (a dedicated channel) or the HS-PDSCH (a shared channel) to use for RRC signaling. When the mobile station 100 is moving at a high rate of speed, the RNC 34 selects the A-DPCH for RRC signaling to increase reliability of the signaling channel. Conversely, when the mobile station 100 is moving at a low rate of speed, the RNC 34 uses the HS-PDSCH for RRC signaling. When switching between channels, the RNC 34 sends a reconfiguration message to the mobile station 100 to reconfigure the RRC connection between the RNC 34 and mobile station 100. The selection of the downlink control channel can be made during connection establishment, and may be changed during the connection if the mobility rate of the mobile station 100 changes.

In some embodiments of the invention, mobility rate detection may be performed by the mobile station 100. In this case, the mobile station 100 may request use of either the A-DPCH or HS-PDSCH for RRC signaling based on the mobility rate. Alternatively, the mobile station 100 could send an indication of its mobility rate to the RNC 34 over an uplink control channel.

Figure 2:
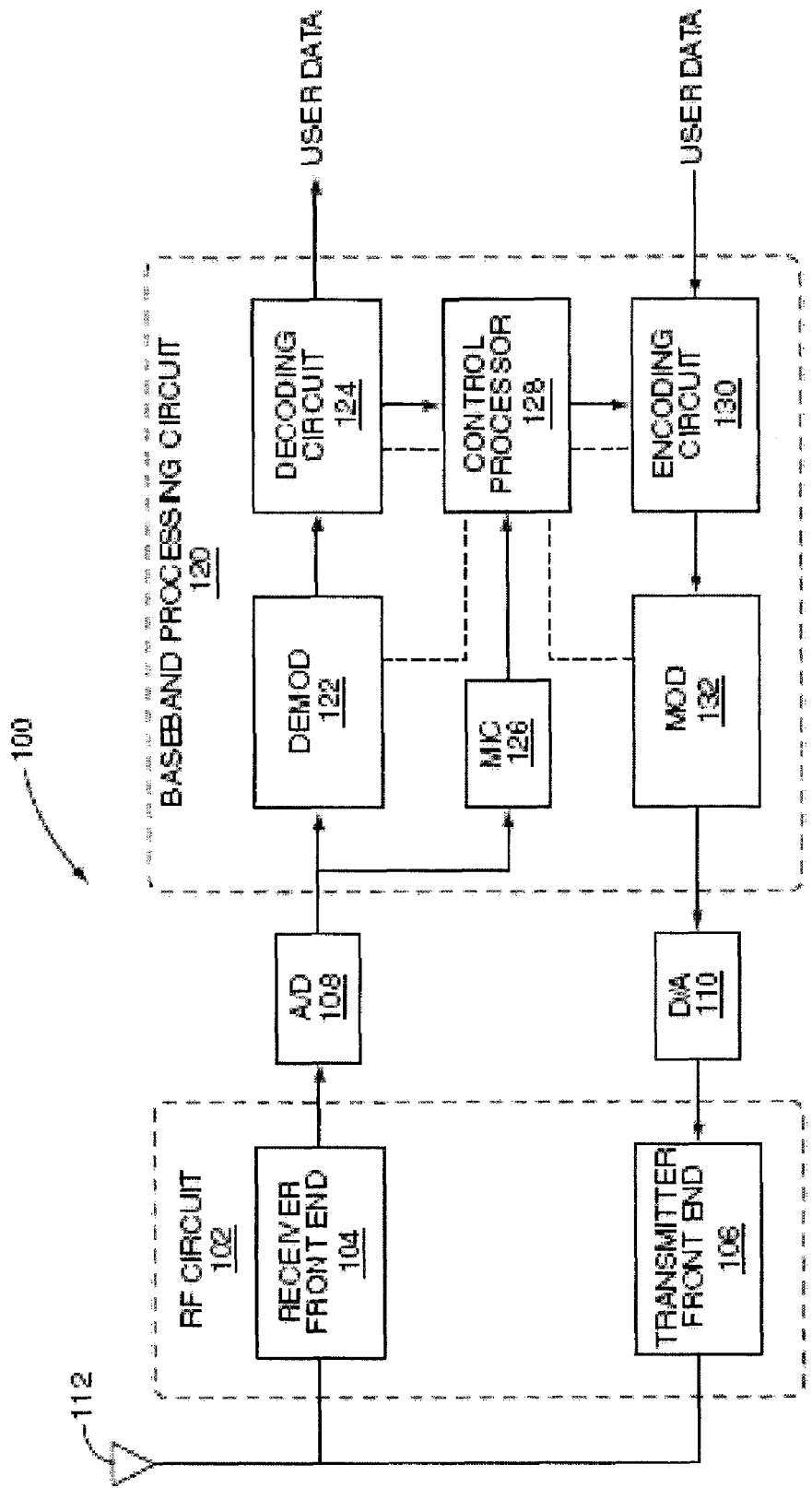
FIG. 2 illustrates an example mobile station.

FIG. 2 illustrates an example mobile station 100 according to embodiments of the present invention. Mobile station 100 comprises a radio frequency (RF) circuit (or transceiver) 102 coupled to one or more antennas 112 and baseband processing circuits 120. The RF circuit 102 comprises a receiver front end 104 and transmitter front end 106. Receiver front end 104 filters, amplifies, and downconverts the received signal. Analog-to-digital converter 108 converts the receiver front end 104 output to a digital signal suitable for processing by the baseband processing circuit 120. On the transmit side, digital-to-analog converter 110 converts transmit signals output from the baseband processing circuit 120 to analog signals suitable for transmission. Transmitter front end 106 modulates the analog transmit signal onto an RF carrier for transmission by antenna 112.

Baseband processing circuit 120 comprises a demodulator 122, decoding circuit 124, measurement circuit (MC) 126, control processor 128, encoding circuit 130, and modulator 132. Demodulator 122 demodulates signals received over the air interface from the mobile station 100 and supplies the demodulated signals to the decoding circuit 124. Demodulator 122 may, for example, comprise a RAKE receiver or chip equalization receiver. Decoding circuit 124 performs channel decoding and separates user data from control message. The control messages, such as the RRC messages from the RNC 34, are passed to control processor 128, which controls the overall operation of the mobile station 100 and which may comprise one or more processors. Control processor 128 handles layer 2 and layer 3 signaling and generates control signals, shown in dotted lines, to configure the demodulator 122, decoding circuit 124, encoding circuit 130, and modulator 132. The control processor 128 is operative to configure the demodulator 122 and decoding circuit 124 responsive to a reconfiguration message from the RNC 34 to receive RRC messages on either the A-DPCH or HS-PDSCH. Measurement circuit 126 performs signal quality measurements on the received signal and provides its signal quality measurements to the control processor 128. Encoding circuit 130 performs channel coding of user data and control signaling. Modulator 132 digitally modulates the signals output from the encoding circuit 130 to generate a transmit signal that is applied to the digital-to-analog converter 110.

It will be appreciated that elements or components of the mobile station 100, such as the baseband processing circuit 120, may be implemented using a variety of hardware and software. For example, the baseband processing circuit 120 may be implemented using one or more microprocessors, microcomputers, digital signal processors (DSPs), special-purpose hardware, such as an application specific integrated circuit (ASIC) and programmable logic devices, or a combination thereof. Further, it will be appreciated that the functions of the baseband processing circuit 120 may be integrated in a single device, such as a single ASIC or microprocessor, or may also be distributed among several devices.

Figure 3:
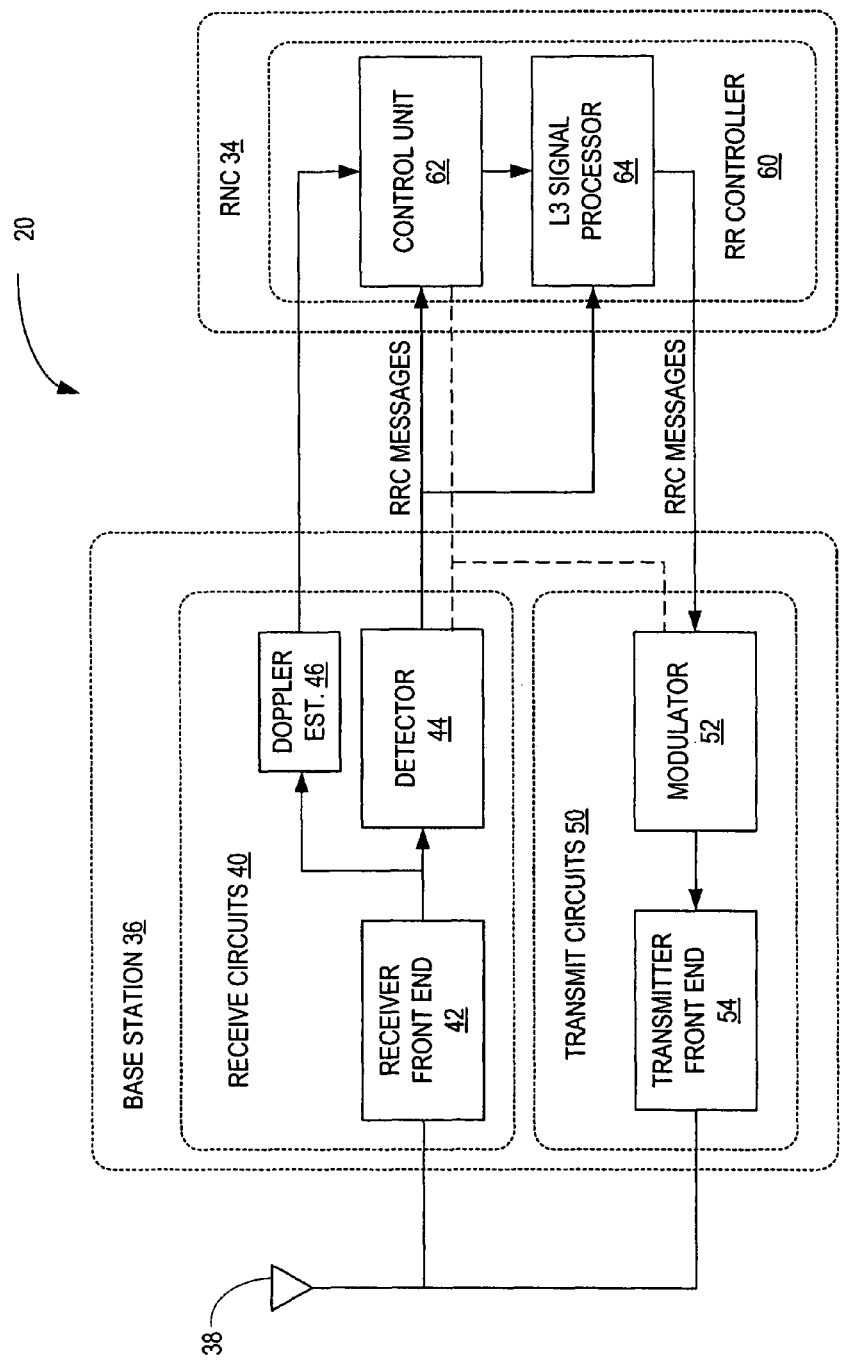
FIG. 3 illustrates an example radio access network.

FIG. 3 illustrates the RNC 34 and BS 36 in more detail. RNC 34 comprises a radio resource controller 60 including a control unit 62 and a Layer 3 (L3) signal processor 64. Control unit 62 contains the control logic for managing the radio resources and generating control signals, shown in dotted lines, to configure the transport, logical, and physical channels at the BS 36. L3 signal processor 64 handles L3 signaling with the mobile station 100. As noted above, RRC messages can be transmitted to the mobile station 100 over an A-DPCH or in-band over the HS-PDSCH. One of the tasks of the control unit 62 is to select the channel to be used for RRC signaling between RNC 34 and mobile station 100.

The BS 36 comprises receive circuits 40 and transmit circuits 50 coupled to an antenna 38 for communicating with one or more mobile stations 100. The receive circuits 40 include a receiver front end 42, detector 44, and a Doppler estimator 46. Receiver front end 42 filters, amplifies, and downconverts the received signal from the mobile station 100. The output signal from receiver front-end 42 is supplied to the detector 44 after A-to-D conversion. Detector 44 includes processing circuits for despreading, demodulating, and decoding the received signals. RRC messages received from the mobile station 100 are passed by the detector 44 to the control unit 62 and/or L3 signal processor 64 in the RNC 34. Transmit circuit 50 includes a modulator 52 and transmitter front end 54. Modulator 52 encodes signals for transmission to the mobile station 100 and maps the encoded signals to corresponding points of a signaling constellation as is well-known in the art. The modulated signals are passed to the transmitter front end 54, which upconverts and amplifies the signals, and modulates the signals onto an RF carrier.

Doppler estimator 46 estimates the Doppler spread of the received signal and provides estimates of the Doppler spread to the control unit 62 in the RNC 34. The Doppler spread provides one indication of the mobility rate of the mobile station 100. Those skilled in the art will appreciate that other parameters may be used as an indication of mobility rate. For example, received signal strength is correlated with the mobility rate and could be used in place of or in addition to the Doppler spread of the received signal as an indication of the mobility rate of the mobile station 100. Also, a mobile station 100 moving at a high rate of speed will be subject to more frequent handovers. Therefore, handover frequency provides another indication of the mobility rate of the mobile station 100. Handover frequency can be determined by the control unit 62 in the RNC 34. Any known parameters correlated with mobile station speed could be used in the present invention as an indicator of mobile station mobility and the present invention is not limited to the specific examples given herein.

It will be appreciated that the BS 36 and RNC 34 may be implemented using a variety of hardware and software. For example, elements and components of the BS 36 and RNC 34 may be implemented using one or more microprocessors, microcontrollers, digital signal processors (DSPs), special-purpose hardware, such as an application specific integrated circuit (ASIC) and programmable logic devices, or a combination thereof. Further, it will be appreciated that the elements and components of the BS 36 and RNC 34 may be integrated in a single device, such as a single ASIC or microprocessor, or may also be distributed among several devices. Also, it will be appreciated that the BS 36 and RNC 34, while shown as separate nodes, by be integrated in a single node.

Figure 4:
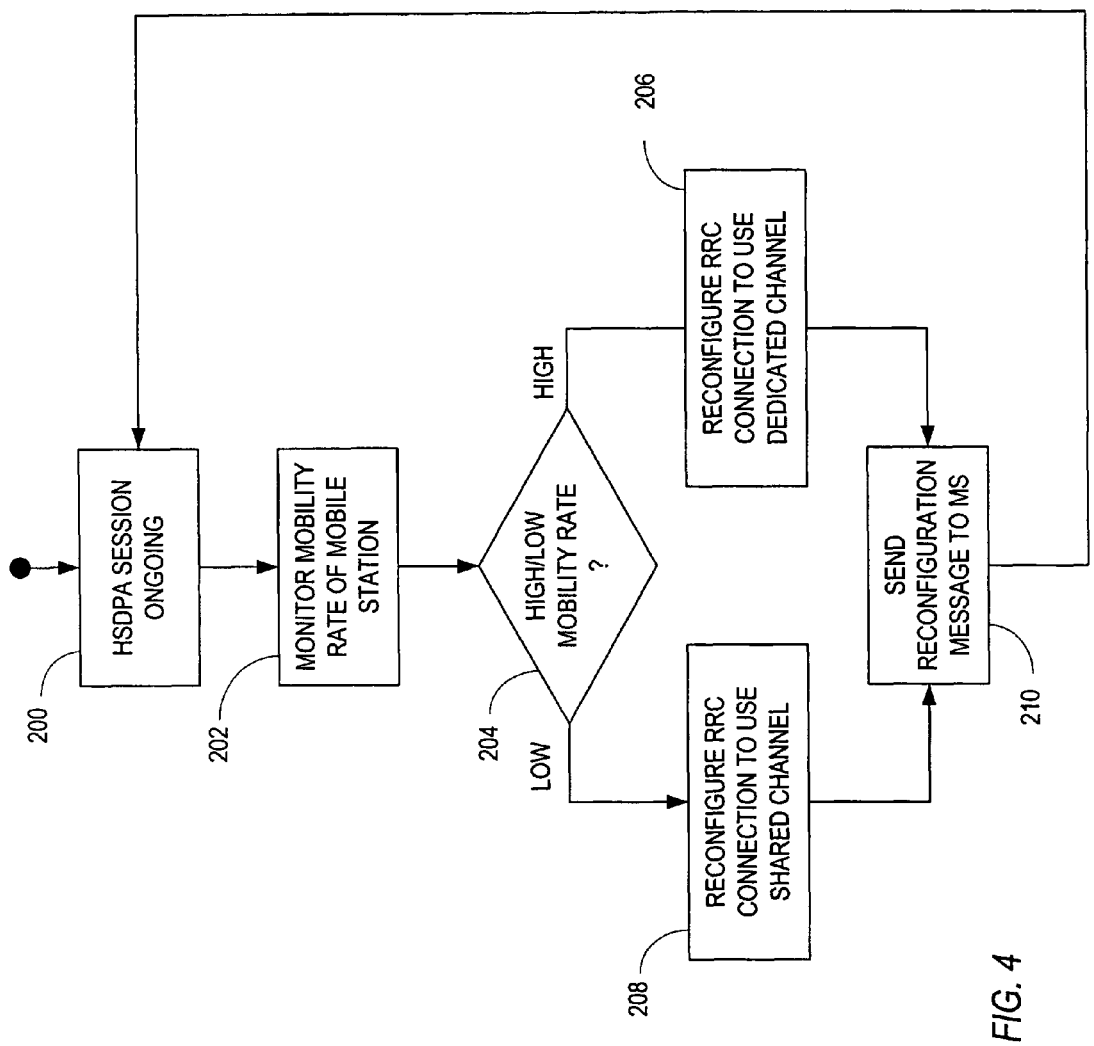
FIG. 4 illustrates example logic for configuring an RRC connection with a mobile station responsive to changes in mobile station mobility.

FIG. 4 is a flow chart illustrating an example procedure implemented by the RNC 34. The procedure is executed when an HSDPA session with the mobile station 100 is ongoing (block 200). During the HSDPA session, the control unit 62 monitors the mobility rate of the mobile station 100 (block 202). When the control unit 62 detects a change in the mobility rate (e.g., from a high mobility rate to a low mobility rate or vice versa) (block 204), the control unit 62 reconfigures the RRC connection with the mobile station 100 (blocks 206, 208) for the RNC 34. When the mobile station 100 switches from a low mobility rate to a high mobility rate, the control unit 62 reconfigures the RRC connection for the RNC 34 to send RRC messages to the mobile station 100 over the A-DPCH (block 206). Conversely, when the mobile station 100 switches from a high mobility rate to a low mobility rate, the control unit 62 reconfigures the RRC connection to send RRC messages to the mobile station 100 in band over the HS-PDSCH (block 208). During the reconfiguration, the L3 processor 64 sends a reconfiguration message to the mobile station 100 (block 210). The reconfiguration of the RRC connection may be made effective when the mobile station 100 acknowledges the reconfiguration message to avoid radio link failure. Thus, if the RNC 34 is currently using the A-DPCH for RRC signaling, the reconfiguration message is sent over the A-DPCH. After the acknowledgement is received by the RNC 34, the RNC 34 uses in band signaling over the HS-PDSCH for RRC signaling for any subsequent RRC messages. Conversely, if the RNC 34 is currently using the HS-PDSCH for RRC signaling, the reconfiguration message is sent over the HS-PDSCH. After the acknowledgement is received by the RNC 34, the RNC 34 used the A-DPCH for subsequent RRC messages.

By switching between dedicated and shared channels for RRC signaling, more efficient use of radio resources can be realized while maintaining a high degree of reliability for the RRC connection between the RNC 34 and mobile station 100. When the mobile station 100 has a high mobility rate, the RNC 34 can allocate power and code resources to the dedicated channel to transmit RRC messages to the mobile station 100. Conversely, when the mobile station 100 is operating at a low mobility rate, transmission over the shared channel should be sufficiently reliable so that the RNC 34 can reallocate power and code resources from the dedicated channel to the shared channel to improve efficiency. Thus, the power and code resources are allocated to the dedicated channel only when necessary to ensure reliable transmission of RRC messages to the mobile station 100 and are made available to the HS-PDSCH when reliable signaling can be achieved over the HS-PDSCH.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A signaling method implemented by a radio network controller, said method comprising:
determining a mobility rate of a mobile station;
selecting, when the mobility rate is low, a shared high speed downlink channel for sending both user data and in-band signaling of radio resource control messages on the same channel;
selecting, when the mobility rate is high, a dedicated downlink channel for sending the radio resource control messages while using the shared high speed downlink channel for sending the user data; and
configuring the signaling connection with the mobile station to use the selected downlink channel.

2. The signaling method of claim 1 wherein the mobility rate of the mobile station is determined based on a signal characteristic of the received signal from the mobile station.

3. The signaling method of claim 2 wherein the signal characteristic comprises a Doppler spread of the received signal from the mobile station.

4. The signaling method of claim 3 wherein the radio network controller receives Doppler spread measurements from a serving base station.

5. The signaling method of claim 2 wherein the signal characteristic comprises a signal strength of a received signal from the mobile station.

6. The signaling method of claim 5 wherein the radio network controller receives measurements of the signal strength from a serving base station.

7. The signaling method of claim 1 wherein the mobility rate of the mobile station is determined based on a handover frequency of the mobile station.

8. The signaling method of claim 1 wherein the dedicated channel comprises a Dedicated Physical Channel and wherein the shared channel comprises a High Speed Physical Downlink Shared Channel in a Wideband Code Division Multiple Access system.

9. A radio network controller to control radio resources allocated to a mobile station, said radio network controller comprising:
   a control unit configured to:
      determine a mobility rate of the mobile station
      select, when the mobility rate is low, a shared high speed downlink channel for sending both user data and in-band signaling of radio resource control messages on the same channel;
      select, when the mobility rate is high, a dedicated downlink channel for sending the radio resource control messages while using the shared high speed downlink channel for sending the user data; and;
      configure the signaling connection with the mobile station to use the selected downlink channel; and
   a signaling processor configured to exchange signaling messages with the mobile station over the signaling connection.

10. The radio network controller of claim of claim 9 wherein the mobility rate of the mobile station is determined based on signal characteristics of a received signal from the mobile station.

11. The radio network controller of claim 10 wherein the signal characteristics comprise a Doppler spread of the received signal.

12. The radio network controller of claim 10 wherein the signal characteristics comprise a signal strength of the received signal.

13. The radio network controller of claim 10 wherein the control unit is configured to receive measurements of the signal characteristics from a serving base station.

14. The radio network controller of claim 9 wherein the mobility rate of the mobile station is determined based on a handover frequency of the mobile station.

15. A computer readable medium storing code for controlling a radio network controller, said code including:
   code for determining a mobility rate of a mobile station
   code for selecting, when the mobility rate is low, a shared high speed downlink channel for sending both user data and in-band signaling of radio resource control messages on the same channel;
   code for selecting, when the mobility rate is high, a dedicated downlink channel for sending the radio resource control messages while using the shared high speed downlink channel for sending the user data; and;
   code for configuring the signaling connection with the mobile station to use the selected downlink channel.

16. The computer readable medium of claim 15 wherein the code for determining a mobility rate of a mobile station analyzes a signal characteristic of a received signal from the mobile station.

17. The computer readable medium of claim 16 wherein the code for determining a mobility rate of a mobile station determines the mobility rate based on the signal strength of the received signal.

18. The computer readable medium of claim 16 wherein the code for determining a mobility rate of a mobile station determines the mobility rate based on the Doppler spread of the received signal.

19. The computer readable medium of claim 15 wherein the code for determining a mobility rate of a mobile station determines the mobility rate based on handover frequency.

* * * * *

UNITED STATES PATENT AND TRADEMARK OFFICE
CERTIFICATE OF CORRECTION

| | | |
|---|---|---|
| PATENT NO. | : 7,885,662 B2 | Page 1 of 1 |
| APPLICATION NO. | : 11/286500 | |
| DATED | : February 8, 2011 | |
| INVENTOR(S) | : Lindoff et al. | |

It is certified that error appears in the above-identified patent and that said Letters Patent is hereby corrected as shown below:

In Column 9, Line 27, in Claim 10, after "of claim" delete "of claim".

Signed and Sealed this
Fourth Day of October, 2011

David J. Kappos
*Director of the United States Patent and Trademark Office*